(12) United States Patent
Ballato et al.

(10) Patent No.: US 9,139,467 B2
(45) Date of Patent: Sep. 22, 2015

(54) LOW BRILLOUIN SCATTERING OPTICAL FIBERS AND FORMATION METHODS THEREOF

(71) Applicants: Clemson University, Anderson, SC (US); University of Illinois at Urbana-Champaign, Urbana, IL (US)

(72) Inventors: John Ballato, Clemson, SC (US); Peter D. Dragic, Champaign, IL (US)

(73) Assignees: Clemson University, Clemson, SC (US); Board of Trustees of the Univ. of Illiniois—Urbana, Urbana, IL (US)

( * ) Notice: Subject to any disclaimer, the term of this patent is extended or adjusted under 35 U.S.C. 154(b) by 0 days.

(21) Appl. No.: 14/245,448

(22) Filed: Apr. 4, 2014

(65) Prior Publication Data

US 2014/0301706 A1 Oct. 9, 2014

Related U.S. Application Data

(60) Provisional application No. 61/808,370, filed on Apr. 4, 2013.

(51) Int. Cl.
*G02B 6/02* (2006.01)
*C03B 37/027* (2006.01)
*G02B 6/036* (2006.01)

(52) U.S. Cl.
CPC .......... *C03B 37/027* (2013.01); *G02B 6/03694* (2013.01); *C03B 2201/10* (2013.01); *C03B 2201/28* (2013.01); *C03B 2201/32* (2013.01); *C03B 2201/54* (2013.01); *C03B 2205/72* (2013.01)

(58) Field of Classification Search
CPC .............................. G02B 6/02; G02B 6/03694
USPC .................................................. 385/123–128
See application file for complete search history.

(56) References Cited

U.S. PATENT DOCUMENTS 8,406,599 B1 * 3/2013 Dragic .......................... 385/141
8,750,655 B1 * 6/2014 Dragic ............................ 385/13

* cited by examiner

Primary Examiner — Robert Tavlykaev
(74) Attorney, Agent, or Firm — Dority & Manning, P.A.

(57) ABSTRACT

Disclosed is an optical fiber formed from a preform that includes a clad component and a core component. The core component includes one or more precursor core materials. The precursor core materials and the clad materials are selected such that that the photoelastic constants of at least one precursor core material and the clad material are of opposite sign resulting in a final glass optical fiber of tailored Brillouin performance. The clad material may include an oxide glass having a positive photoelastic constant and the core component may include a precursor core material that has a negative photoelastic constant. During formation, the precursor core material can melt and interact with clad material that precipitates into the core to form a glass of at least one tailored Brillouin property, such as very low Brillouin gain.

32 Claims, 10 Drawing Sheets

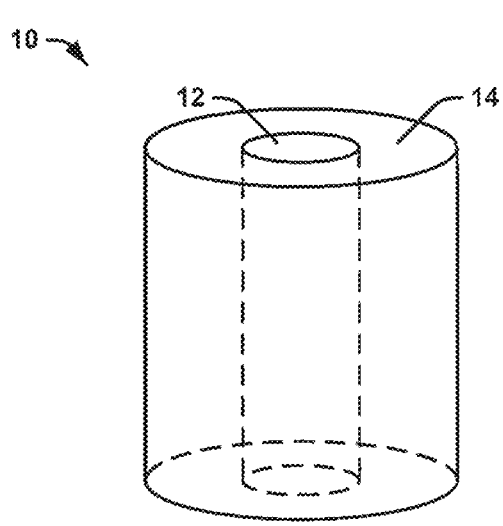
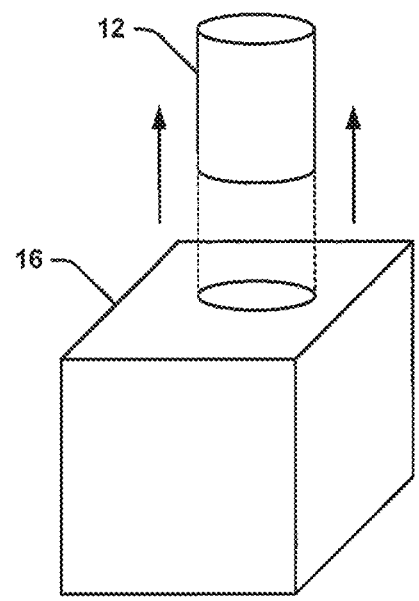
FIG. 1
FIG. 2
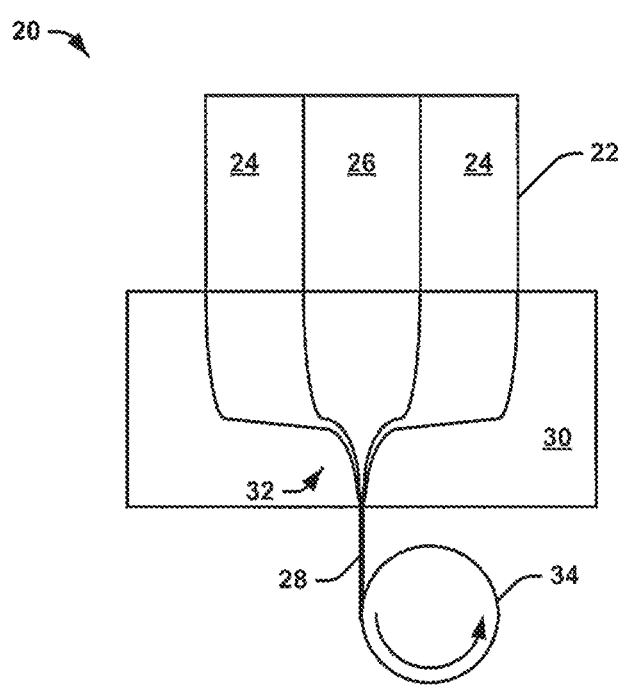
FIG. 3

LOW BRILLOUIN SCATTERING OPTICAL FIBERS AND FORMATION METHODS THEREOF

CROSS REFERENCE TO RELATED APPLICATION

This application claims filing benefit of U.S. Provisional Patent Application Ser. No. 61/808,370 having a filing date of Apr. 4, 2013, which is incorporated herein by reference in its entirety.

STATEMENT AS TO RIGHTS TO INVENTIONS MADE UNDER FEDERALLY SPONSORED RESEARCH

This invention was made with Government support under Contract No. W911NF-12-1-0602 awarded by the United States Department of Defense. The Government has certain rights in the invention.

BACKGROUND

Typical optical fibers include a core material and a cladding material, with each of the core and the cladding traditionally being fabricated largely from fused silica and having dissimilar refractive indices. A fiber can be formed by drawing a preform, which is a large mass that includes the core and cladding materials arranged in a shape that can resemble the cross-section of the finished fiber, but is much larger. The preform can be drawn in a fiber drawing tower during which the preform is heated and stretched from one end to form the optical fiber.

Optical fibers need to be able to operate at progressively higher power levels as performance demands continue to grow. A leading impairment to high power systems, and particularly high-power-per-unit-bandwidth systems, is stimulated Brillouin scattering (SBS), which is an acousto-optic interaction that manifests noise in low power applications and acts as a highly-efficient power reflector in high power applications. While there are optical fiber-based applications that do not have strict requirements on the laser spectrum, many systems such as spectroscopic lidar systems and coherently-phased fiber laser arrays rely principally on the ability to achieve a desired wavelength and spectral purity. SBS remains a serious stumbling block to the improvement of such systems.

In an attempt to decrease SBS, a variety of silica-based fibers possessing unconventional core compositions have been developed. Exemplifying such silica-based novel fibers are those derived using yttrium aluminum garnet (YAG) crystals. Unfortunately, while these materials show promise in decreasing SBS, such core compositions are very difficult if not impossible to realize using the chemical vapor deposition methods conventionally employed to manufacture optical fiber. Fiber designs including tailored acoustic velocity profiles of the fiber core and cladding that spread the SBS interaction over multiple acoustic frequencies have also been employed to lessen SBS. With careful fiber design, pure silica clad fibers with alumina-doped silica cores have also been formed to increase the acoustic wave loss, thereby decreasing the nonlinear interaction time and the Brillouin gain coefficient. While each of these complex and costly fabrication methods have been proven to partly suppress SBS or offer moderate enhancements in power levels, sufficient narrow-linewidth power scaling will remain impossible without a paradigm shift in the approach to the management of SBS.

What are needed in the art are optical fibers that exhibit extremely low, even zero, Brillouin scattering. In addition, what are needed in the art are facile, economical methods for forming such fibers.

SUMMARY

According to one embodiment, an optical fiber is disclosed. The optical fiber includes a core material and a clad material. More specifically, the core material is the interaction product of a precursor core material and the clad material, and the precursor core material and the clad material have photoelastic constants of opposite sign.

In one embodiment, the precursor core has a single component and the precursor core and the clad material can have photoelastic constants of opposite sign. According to another embodiment, the precursor core can include multiple precursor core materials, and one or more of the precursor core materials can have a photoelastic constant of opposite sign to that of the clad material. In this embodiment, the photoelastic constant of the precursor core can be the same or opposite of the photoelastic constant of the clad material. In those embodiments in which the photoelastic constant of the precursor core is of the same sign as that of the clad material, the absolute value of the photoelastic constant of the precursor core can be about 0.5 or less of the photoelastic constant of the clad material.

Also disclosed are methods for forming an optical fiber. For example, a method can include drawing a fiber preform, the fiber preform including a core component and clad component. The core component can include a precursor core material and the clad component can be formed of a clad material. In addition, the precursor core material and the clad material can have photoelastic constants of opposite signs. In one embodiment, at least one component of the core component and the clad material can have photoelastic constants of opposite signs. The fiber preform can be drawn at a draw temperature at which the precursor core material is molten.

BRIEF DESCRIPTION OF THE FIGURES

FIG. 1 schematically illustrates an example of a preform for forming an optical fiber in accordance with an aspect of the disclosure.

FIG. 2 schematically illustrates an example of core-drilling a rod for forming an optical fiber in accordance with an aspect of the disclosure.

FIG. 3 schematically illustrates an example of a system for forming an optical fiber in accordance with an aspect of the disclosure.

FIG. 22(*b*) presents an example of a splice of a segment of a fiber as described herein (left-side of image) to standard telecom fiber (right-side of image).

Figure 4:
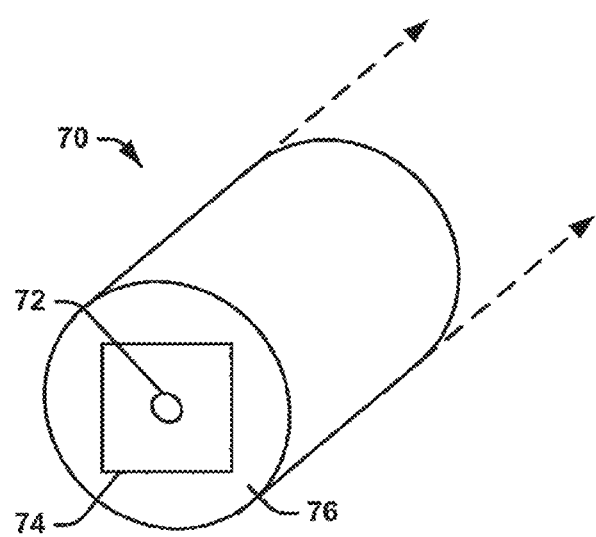
FIG. 4 schematically illustrates an optical fiber in accordance with an aspect of the disclosure.

Repeat use of reference characters in the present specification and drawings is intended to represent the same or analogous features or elements of the present disclosure.

DETAILED DESCRIPTION

Reference will now be made in detail to various embodiments of the disclosure, one or more examples of which are illustrated in the accompanying drawings. Each example is provided by way of explanation of the subject matter, not limitation thereof. In fact, it will be apparent to those skilled in the art that various modifications and variations can be made in the present disclosure without departing from the scope or spirit of the subject matter. For instance, features illustrated or described as part of one embodiment, can be used on another embodiment to yield a still further embodiment.

The present disclosure relates generally to optics, and more particularly to optical fiber systems and methods. According to disclosed methods and systems, an optical fiber can be formed that exhibits very low Brillouin scattering (also referred to throughout this disclosure as Brillouin activity or Brillouin activity), and in one embodiment, having zero Brillouin activity. In addition, disclosed fibers can exhibit very large Brillouin frequency shift and athermal Brillouin characteristics, i.e., the Brillouin frequency shift of the fibers can be essentially immune to change in temperature and/or a-tensic characteristics, in which the Brillouin frequency shift of the fibers can be essentially immune to change in strain.

Also disclosed are methods for forming the fibers. Briefly, an optical fiber can be formed from a preform that includes a clad glass and a core precursor material. The clad material can include a glass having a photoelastic (Pockels) constant that is either positive or negative, and the precursor core material can be a material that can have a photoelastic constant of the opposite sign as the clad material. For instance, if the clad glass is a silica, which has a positive photoelastic constant, the core precursor material can have a negative photoelastic constant, and vice versa. In one embodiment, the precursor core can be a multi-component precursor core comprising a plurality of precursor core materials and one or more of the precursor core materials can have a photoelastic constant that is of the opposite sign as the clad material. In another embodiment, the precursor core can comprise a single precursor core material having a photoelastic constant of opposite site to that of the clad material.

In addition, the precursor core material can have a melting temperature that is lower than the draw temperature of the clad material.

Formation methods include drawing the fiber at a temperature greater than the melting temperature of the precursor core material, leading to formation of a multi-order (e.g., binary, ternary, etc.) glass core in the formed fiber. More specifically, the glass core of the formed fiber is the interaction product of the of the molten precursor core material with the partially dissolved clad material. The core precursor and clad materials are selected such that they exhibit miscibility above the melting temperature of the core temperature and the core material is thus formed during the fiber draw. During formation, the glass core interaction product is quickly quenched so as to avoid phase separation thus forming a multi-order glass core that is one homogeneous (glassy) phase the composition of which includes both compounds.

The formation process utilized to form the disclosed fibers can be highly beneficial as the core material of the formed fiber is the multi-order interaction product of the precursor material(s) that have positive and/or negative photoelastic constants. Attempts to form fibers including such core materials according to traditional fiber forming methods would not succeed. According to a traditional fiber forming method, the final core material would first be formed as a core preform and then the preform would be drawn to alter the shape of the preform while retaining the material make-up of the preform. When considering a final fiber core of the interaction products as described herein, however, a preform of the final core material would phase-separate during the fiber draw. In the presently disclosed methods the interaction product core material is formed at the time of the fiber draw, rather than previous to the draw as in traditional methods. Thus, the final product core material is formed at the draw and then quickly quenched; preventing the phase separation that would ensue if the fibers were to be formed according to traditional formation methods.

Beneficially, it has been found that the photoelastic characteristics of the precursor core material and the clad material can be tailored upon development in the core of the multi-order glass system during fiber formation. The complementarity of the photoelastic coefficients of the precursor materials used in forming the core glass and the homogenous nature of the product core material provides for the very low Brillouin scattering levels of the formed fibers.

In one embodiment, the disclosed fibers can have a Brillouin gain coefficient of less than about $10^{-10}$ meters per Watt (m/W). For instance, a fiber can have a Brillouin gain coefficient of less than about $5 \times 10^{-1}$ m/W, less that about $10^{-11}$ m/W, less than about $10^{-12}$ m/W, or less than about $10^{-13}$ m/W. In one embodiment the Brillouin gain coefficient can be between about $4.5 \times 10^{-11}$ m/W and about $2 \times 10.16$ m/W. The Brillouin gain coefficient is defined as follows for a given optical wavelength ($\lambda$):

$$g_g = 2\pi n^1 p_{12}^2 / c \lambda \rho V_g \Delta v_B$$

where
$V_a$ is the acoustic velocity
$\rho$ is the mass density
$n$ is the refractive index
$\Delta v_B$ is the Brillouin spectral width
$p_{12}$ is the Pockels elasto-optical coefficient Since the SBS threshold is inversely proportional to this quantity, the requisite $g_B$ will depend on the amount of optical power desired for a fiber system.

The fibers can have a very high Brillouin frequency. The Brillouin frequency can be determined from the product of two times the acoustic velocity of the acoustic mode times the refractive index of the optical mode divided by the optical wavelength. For example, for wavelengths near 1550 nm, a fiber can have a Brillouin frequency greater than about 10 GHz, greater than about 12 GHz, or greater than about 13 GHz. For instance, a fiber can have a Brillouin frequency from about 13 GHz to about 16 GHz. The fibers can also exhibit little change in Brillouin characteristics with regard to temperature. For instance, the frequency can change by less than about 1000 kHz per degree Kelvin (kHz/K), or less than about 750 kHz/K. In one embodiment, the fibers can be athermal with regard to Brillouin frequency. For instance, Brillouin frequency can change by less than about 20 kHz/K, less than about 15 kHz/K, or less than about 10 kHz/K.

The fibers can also exhibit little change in Brillouin characteristics with regard to strain. For instance, the frequency can change by less than about 500 MHz per % of elongation, or less than about 400 kHz/% elongation. In one embodiment, the fibers can be a-tensic with regard to frequency. For instance, frequency can change by less than about 20 MHz/% elongation, less than about 15 MHz/% elongation, or less than about 1 MHz/% elongation.

In general, the low Brillouin gain fibers can be formed according to a preform draw process. FIG. 1 demonstrates an example of a preform 10 for forming an optical fiber. The preform 10 includes a core component 12 and a clad component 14. The preform 10 can be drawn to form an optical fiber. The clad component 14 can include a clad material that can be any of a variety of oxide glasses that can have a positive or a negative photoelastic constant. For example, the clad component 14 can include oxide glasses, such as silicate glasses, phosphate glasses, germanate glasses, and the like that have a positive photoelastic constant. By way of example, silica glass, borosilicate glass, and so forth can be utilized in forming the clad component 14. In one embodiment, the clad component 14 can be formed of pure silica. In another embodiment, the clad component 14 can include a high proportion of silica. For instance, the clad component 14 can be a silicate with a silica concentration of greater than about 90 mole percent, or greater than about 95 mole percent.

Furthermore, the clad component 14 can be doped with any of a variety of dopants to achieve a desired Brillouin scattering property, refractive index, thermal expansion coefficient, and/or draw temperature such that it draws into fiber at a temperature above the melt temperature of the precursor core material.

The core component 12 can include a precursor core material that has a photoelastic constant that is opposite in sign to the photoelastic constant of the clad material. More specifically, all or only a portion of the precursor core material(s) that form the core component 12 can have a photoelastic constant that is opposite in sign to that of the clad material. For example, in one embodiment, the core component 12 can include a plurality of different precursor core materials in a composite precursor core. In this embodiment, at least one of the plurality of precursor core materials can have a photoelastic constant that is opposite in sign to the photoelastic constant of the clad material. In another embodiment, the core component 12 can be formed of a single precursor core material that has a photoelastic constant that is opposite in sign to the photoelastic constant of the clad material. In this embodiment, the precursor core can have a photoelastic constant that is opposite in sign to the photoelastic constant of the clad material.

In those embodiments in which the precursor core component 12 is a composite of precursor core materials, at least one precursor core material can have a photoelastic constant that is opposite in sign to the photoelastic constant of the clad material. In this embodiment, the overall photoelastic constant of the core component 12 can be either of the same sign or the opposite sign as that of the clad material. For instance, some silicates such as magnesium aluminum silicate as may be utilized as the core component 12 can include a constituent material that has a negative photoelastic constant (e.g., alumina, magnesia) in conjunction with a constituent material that has a positive photoelastic constant (e.g., silica). The overall photoelastic constant of such a silicate precursor core component may be low and positive. Similarly, a precursor core component 12 such as YAG can have a low and positive photoelastic constant overall and can include both alumina (a negative photoelastic constant) and yttria (a positive photoelastic constant). When these multiple precursor core materials are combined as a composite precursor core component with a clad material to form a preform, the composite core component can have an overall photoelastic constant that is of the opposite sign to that of the clad material. However, in another embodiment, the composite core component can have an overall photoelastic constant that is of the same sign as that of the clad material. When this is the case, the absolute value of the photoelastic constant of the composite core component can be significantly less than the absolute value of the photoelastic constant of the clad component (or the clad material). For instance, the absolute value of the photoelastic constant of the composite core component can be about 0.5 or less of the photoelastic constant of the clad component. In one embodiment, the absolute value of the photoelastic constant of the composite core component can be about 0.35 or less of the photoelastic constant of the clad component, or about 0.25 or less in some embodiments.

In one embodiment, the core component 12 can include an aluminum-based compound having a negative photoelastic constant, including, without limitation, an aluminate, an aluminosilicate, an aluminophosphate, an aluminoborate, and so forth. In one embodiment, the core component 12 can include aluminum oxide, $Al_2O_3$, e.g., sapphire. For instance, the entire core component can be formed of a single material that has a negative photoelastic constant and this core component can be combined with a clad component formed entirely of a single material that has a positive photoelastic constant.

In addition to the relationship of the photoelastic constants of the core and clad components, the preform materials can also have a thermal relationship. More specifically, the core component 12 can have a melting temperature that his less than the draw temperature of the clad component 14.

It should be understood that precursor core materials for use in forming the core component 12 are not limited to aluminum-based materials, and other materials can alternatively be utilized and paired with a clad material that has a photoelastic constant of the opposite sign (or larger absolute value, as discussed above) and appropriate draw temperature (i.e., the draw temperature of the clad component 14 is greater than the melting temperature of the core component 12). For example, the core component 12 can include spinel ($MgAl_2O_4$), barium oxide (BaO), β-barium borate ($BaB_2O_4$), and so forth as precursor core materials that can melt at the fiber draw temperature and result in a multi-order glass core that is the interaction product of the precursor core material(s) and dissolved clad material.

During fiber formation, as the core component becomes molten, it interacts with dissolved cladding material resulting in the formation of a multi-order glass core in the formed fiber. Thus, the formed fiber can be an all-glass optical fiber including an outer clad and an inner glass core of a composition that differs from the core precursor material(s).

In addition to the benefits previously mentioned, the formation technique of the optical fibers can provide an optical fiber with a very high concentration of desirable materials in the core. For instance, when considering formation of an optical fiber by use of an aluminum-based oxide core precursor material, the formed fiber can include a very high concentration of alumina, and in particular, much higher than possible according to conventional formation processes in which an alumina may at most be included as a dopant in the core due to phase separation issues as discussed previously. For example, the core of the all-glass optical fiber can have an aluminum oxide concentration of greater than about 15 mole percent of the core component, or greater than about 20 mole percent, in one embodiment. For instance, the all-glass fiber can have an aluminum oxide concentration in the core of from about 20 mole percent to about 90 mole percent of the core component, or from about 30 mole percent to about 80 mole percent of the core component, or about 55 mole percent of the core component. In one embodiment, a fiber can have an average alumina concentration of 54 mole percent of the core component and a Brillouin gain coefficient of less than about $10^{-12}$ m/W, for instance about $3 \times 10^{-13}$, which is nearly 100 times lower than commercial fiber as currently known and the lowest specified value known to date. In another embodiment, a fiber formed with an average alumina concentration of about 38 mole percent was found to be athermal in its Brillouin frequency.

The core component 12 can also include one or more dopants as are known in the art for inclusion in an optical fiber core such as active dopants. For instance, the core component 12 can include as dopant one or more selected Group III and IV elements, rare earth elements, transition metals, and so forth. In one embodiment, the core component 12 can be doped with a transition metal or lanthanide ion.

The optical fibers can include high concentrations of the aforementioned Group III and IV elements, rare earth elements, and/or transition metal dopants. Thus, disclosed methods can be a route to formation of high dopant content optical fibers.

The core component 12 can be provided in any suitable form. For instance, the precursor core material(s) of the core component 12 can be provided as a plurality of chips, as a powder, or in any other form. Moreover, the precursor core material can be provided in a crystalline form or in an amorphous form.

In one embodiment, the core component 12 can be formed by compacting powders of the precursor core material to form a solid rod. This may serve to limit the amount of air removal during the fiber formation. In another embodiment, however, it may be preferred to provide the core component 12 in the form of a powder or particle mixture, with no compacting prior to loading the core component 12 in the cladding component 14.

A preform 10 can be formed by first forming the clad component 14 with the desired geometry. In the example of FIG. 1, the clad component 14 is demonstrated as substantially cylindrical. However, it is to be understood that the clad component 14 can have any of a variety of cross-sectional shapes, such as rectangular, elliptical, or "D"-shaped. As an example, a hole can be drilled in a solid rod of the cladding material, such as substantially at a center axis or cross-sectional centroid of the solid rod to form a tubular shape having open ends as the clad component 14 as illustrated in the example of FIG. 1. The core also need not be centered within the clad. For instance, the core can be offset from the center of the final fiber, or can follow a helical trajectory along the length of the fiber.

The core component 12 can be in any suitable starting formation, such as a boule, window, slug, a plurality of chips, a powder, and so forth. For example, the core component 12 can be a compacted powder including the precursor for the desired core material and shaped in the form of a boule. FIG. 2 demonstrates an example of core-drilling a compacted core component 12 in the form of a rod. As described herein, the term "core-drilling" can refer to the use of a cylindrical core-drill, or can refer to boring, pressing, and/or stamping a boule 16 to generate the core component 12. Although the example of FIG. 2 demonstrates that the boule 16 is cubical in shape, it is to be understood that a boule can have any of a variety of shapes, such as substantially cylindrical or spherical.

Referring again to FIG. 1, the core component 12 can be inserted or "sleeved" in a hole that has been drilled into the clad component 14. It is to be understood that core-drilling to obtain a rod-shaped core component 12, as demonstrated in the example of FIG. 2, and sleeving the rod of core component 12 into the clad component 14 is one of a variety of different ways to form the preform 10. As another example, the hole can be filled with the precursor material for forming the core in the form of a powder or a plurality of chips to locate the core component 12 within the clad component 14. Thus, the preform 10 can be generated in any of a variety of ways. The resultant preform 10 can be drawn into an optical fiber, such as via a fiber drawing tower.

FIG. 3 demonstrates an example of a system 20 for forming an optical fiber. The system 20 demonstrates a preform 22 that includes a clad component 24 and a core component 26, such as similar to the preform 10 in the example of FIG. 1. For example, the clad component 24 can include a positive photoelastic constant material as the clad material and the core component 26 can include a negative photoelastic constant material as the precursor core material. In the example of FIG. 3, the preform 22 is being drawn to form an optical fiber 28.

The system 20 includes a hot zone 30, such as can be included in a fiber drawing tower furnace. As an example, the hot zone 30 can apply heat that is sufficient to soften the material of the clad component 24 and to melt the core precursor material of the core component 26. Specifically, the hot zone 30 can be set to a temperature that is above the melting point of the core precursor material and at which the clad component 24 is sufficiently soft so as to draw as desired. Temperatures for the hot zone 30 during a drawing process can depend upon materials included in the preform 22, the size of the preform 22 and the fiber 28, and the like.

The draw temperature at which the precursor core material is molten and the clad component 24 is at a viscosity to provide an acceptable draw can be only slightly above the melting temperature of the core component 26 (i.e., the one or more precursor core materials), For instance, the draw temperature can be less than about 10° C. above the melting temperature of the precursor core material(s), for instance between about 1° C. and about 10° C. above the melting temperature of the precursor core material. This may be preferred in an embodiment in which the melting temperature of the core component 26 and the targeted drawing temperature of the clad component 24 can be quite close to one another. However, as an alternative example, the drawing temperature of the hot zone 30 can be greater than about 10° C. higher than the melting temperature of the core component 26, for example greater than about 20° C. higher, greater than about 50° C. higher, or more. Furthermore, the expansion coefficients of the precursor core material(s) and the cladding material can be substantially similar, or even substantially the same. However, it is to be understood that the expansion coefficient of the precursor core material and the cladding material can also differ.

In general, the draw can be carried out under atmospheric conditions. This is not a requirement, however, and the draw can alternatively be carried out under vacuum (e.g., complete or partial vacuum), in a reducing atmosphere, or under an inert atmosphere. While not wishing to be bound to any theory, drawing under a vacuum may improve the rate of removal of any volatile by-products from the resultant fiber.

According to the example of FIG. 3, the preform 22 can be drawn from a first end 32 to form the optical fiber 28. During the draw process, the soft cladding material can act as a crucible to confine the molten precursor core material as it is drawn into the optical fiber 28. During and following the draw, cladding material that partially dissolves into the core can interact with the precursor core material to form a multi-order glass core. The resultant optical fiber 28 can then cool to form an amorphous core of the multi-order glass product.

The resultant core can be single-mode or multimode. The optical fiber 28 can be wound around a take-up reel 34 as it leaves the hot zone 30, such that it can cool and solidify. The optical fiber 28 can subsequently be run through a polymer bath (not shown), such that a jacketing material can be coated onto the optical fiber 28.

Beneficially, fabrication of an optical fiber 28 from a preform 22 can be accomplished in a facile manner. Specifically, upon forming the preform 22, the resultant optical fiber 28 can be formed in a manner similar to typical fibers formed of traditional materials. However, the optical fiber 28 can exhibit superior optical performance due to the multi-order glass core. It is to be understood that the system 20 in the example of FIG. 3 is demonstrated simplistically, and that any of a combination of fiber forming techniques can be implemented in forming the resultant optical fiber 28. Specifically, the system 20 is not intended to be limited to the example of FIG. 3.

FIG. 4 demonstrates an example of an optical fiber 70. The optical fiber 70 can be a resultant drawn optical fiber, such as the resultant optical fiber 28 in the example of FIG. 3. The optical fiber 70 includes an outer cladding 76, an inner cladding 74, and a core 72. The outer cladding 76 can be formed of any of a variety of glass materials. For example, the outer cladding 76 can include oxide glasses, such as silicate glasses, phosphate glasses, germanate glasses, and the like. The outer cladding 76 can include other glasses such as halide glasses, an example of which is fluoride glasses. As another example, outer cladding 76 can include chalcogenides such as sulfide glasses, selenide glasses, telluride glasses, and so forth.

The inner cladding 74 can be, e.g., a pump cladding, and can be formed from a positive or negative photoelastic constant material such as an oxide glass material having a positive photoelastic constant. The outer cladding 76 and the inner cladding 74 can be formed of the same or different glasses such as different respective glass materials or the same glass material with different dopants. The core 72 can include a multi-order glass, similar to as described above in the examples of FIGS. 1 through 3.

The core and/or clad of a given fiber is not limited to having a circular cross-section. For instance, as shown in FIG. 4, the inner cladding 74 is demonstrated as having a substantially rectangular (e.g., square) cross-section.

Disclosed optical fibers represent a marked advancement for a plurality of applications such as telecommunication, sensor, and high energy laser systems. In one embodiment, the optical fibers can be beneficially utilized in lidar applications, such as upper atmosphere helium lidar as may be utilized in climate studies. For example, it has been suggested that the ideal laser for such applications would be a 100 MHz spectral width, pulsed ytterbium system, however with currently available systems it is impossible to obtain the necessary power due to SBS. The disclosed optical fibers can provide a route to obtaining this ideal system. Similarly, the National Aeronautics and Space Administration has been working to develop a carbon dioxide lidar system for some time, but has been unable to obtain the necessary power in the developmental systems. The disclosed optical fibers could solve such problems.

Disclosed fibers can also be utilized in development of systems that could beneficially utilize a narrow linewidth, such as sensor applications (e.g., oxygen sensors). In addition, disclosed fibers can be formed to longer lengths with lower losses, which could be useful in forming Raman-shifters. Narrow linewidth lasers that can be utilized at any wavelength present multiple possibilities, including use in applications in which dye lasers are currently utilized.

The disclosure may be further understood with reference to the Examples, set forth below.

EXAMPLE

A single-crystalline sapphire rod of unknown purity, measuring about 2.8 mm in diameter by 100 mm in length (Almaz Optics, Marlton, N.J.), was sleeved inside an F300 fused silica tube (Hereaus-Tenevo, Buford, Ga.) measuring about 3 mm inner diameter by 30 mm outer diameter. This preform assembly was drawn at 2100° C. on a Heathway optical fiber draw tower (Clemson University) into fiber at a rate of 20 m/min with a target diameter of 150 μm. The 2100° C. draw temperature exceeded the 2050° C. melting point of the sapphire permitting fiberization using the molten core approach described herein. As the draw temperature was higher than that usually employed to fabricate silica optical fiber, the draw tension was reduced with the final diameter of the fiber fluctuating between about 125 and about 170 μm over the 450 meters of fiber that was drawn. However, this was beneficial as it permitted a single draw to yield a range of fiber diameters that were consistent over several meter lengths that could be reliably tested.

For molten-core derived fibers, the diameter influences the core composition due to core/clad dissolution- and diffusion-related processes. Thus, each fiber section of differing diameter had concomitantly a different alumina concentration. Accordingly, one draw permitted a systematic evaluation of properties as a function of alumina concentration. All fiber lengths utilized in the Brillouin measurements were less than two meters where the diameter and core composition largely were constant. The fiber was coated during the draw with a standard single coating (DSM Desotech Inc., Elgin, Ill.) to a final diameter of about 270 μm.

Elemental analysis was conducted under high vacuum, using energy dispersive x-ray (EDX) spectroscopy in secondary electron (SE) mode on a Hitachi SU-6600 analytical variable pressure field emission scanning electron microscope. Prior to examination, the fibers were sleeved and UV epoxy cured into silica glass ferrules and their ends mechanically polished to a 1 micron finish. The fiber samples were sputter coated with carbon prior to analysis to provide a conductive layer to mitigate any charging effects from the glass. The refractive index profile at arbitrary positions along the length of the fiber was measured at 980 nm by Interfiber Analysis Inc. using a spatially resolved Fourier transform technique.

Spectral attenuation measurements were performed on a typical 4.5 meter segment of the drawn fiber. In the visible range, a tungsten light source was used whereas; for IR measurements, the broadband light source option on the Hewlett-Packard 7095 series optical spectrum analyzer was used.

A heterodyne system was used to measure the Brillouin gain spectrum (BGS) of the various fibers. Briefly, the system launched a narrow-linewidth signal at 1534 nm ($\lambda_o$=1534 nm) through a circulator and into a fiber being tested. The Stokes' signal generated in the test fiber passed back through the circulator, was optically filtered and amplified, and was finally analyzed with a heterodyne receiver. As a control, a standard single mode fiber (SMF-28™, Corning Incorporated) was used. In order to measure the temperature dependence of the frequency, the test fibers were immersed in a heated water bath, controlled from room temperature (21.5° C.) up to the boiling point (100° C.), such that measurements over a temperature range of about 80K could be made.

Table 1 compiles the maximum concentration of alumina and the core size measured from four sections of the sapphire-derived optical fiber.

TABLE 1

| Fiber | Maximum Alumina Content | | Δn × 10⁻³ | Core Size |
| | Mole % | Weight % | (Peak Value) | (μm) |
| --- | --- | --- | --- | --- |
| A | 26.9 | 38.5 | 59.6 | 26.6 |
| B | 30.8 | 43.0 | 70.1 | 30.5 |
| C | 41.2 | 54.3 | 91.7 | 34.2 |
| D | 54.0 | 66.6 | 119* | — |
| SMF-28 ™ | ~4 mole % GeO₂ | | 5.0 | — |

*extrapolated from best-fit curve using data from Fibers A-C

Figure 5:
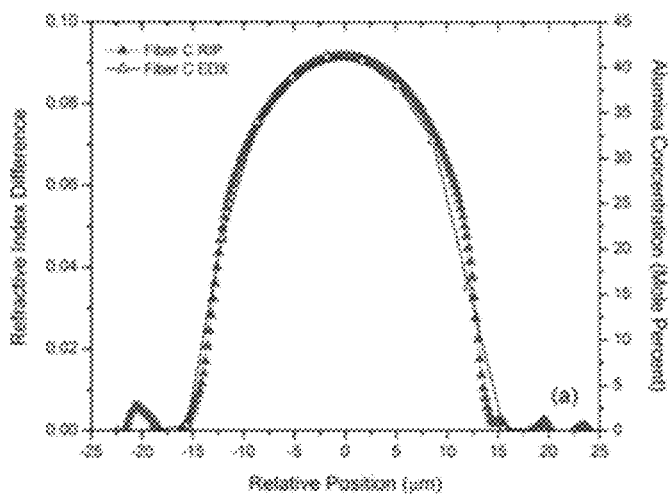
FIG. 5 illustrates a comparison of refractive index (measured at 980 nm) and alumina concentration profile for an optical fiber in accordance with an aspect of the disclosure.

Due to the strength of the Brillouin gain, Brillouin scattering data could only be obtained for Fibers A-C. As can be seen, the maximum alumina content in Fiber D was about 54 mole percent FIG. 5 provides the compound line-profile and the refractive index profile across the core region of Fiber C. The measured refractive index profile and compositional profiles show that the fiber possessed good symmetry and circularity. Absent is the central dip commonly found in germanosilicate fibers due to GeO₂ burn-out, which has been observed and commented on previously with respect to aluminosilicate fibers.

Figure 6:
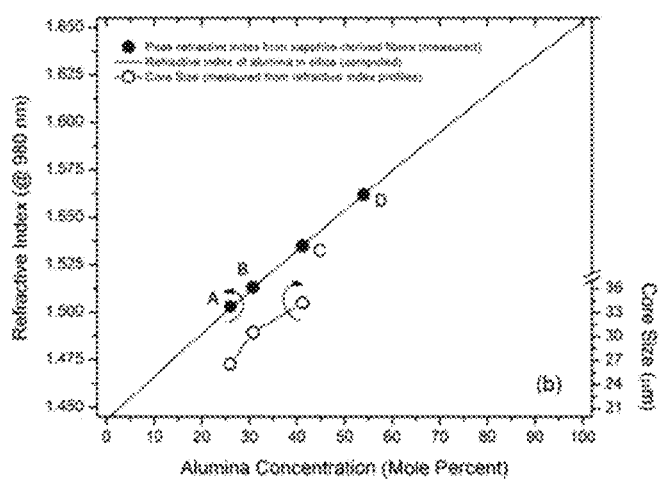
FIG. 6 illustrates the measured peak refractive index, computed index dependence and measured core size, all as functions of alumina concentration, for optical fibers in accordance with an aspect of the disclosure.

FIG. 6 provides the refractive index profiles measured on the fibers with differing alumina concentrations. Comparing the measured peak refractive index against the measured peak core alumina concentration leads to a molar refractive index dependence of about +2.3×10⁻³ per mole % at lower alumina concentrations (up to about 30 mol %). All of the maximum measured alumina concentrations are within the two-phase, liquid-liquid immiscibility region for binary aluminosilicates.

Figure 7:
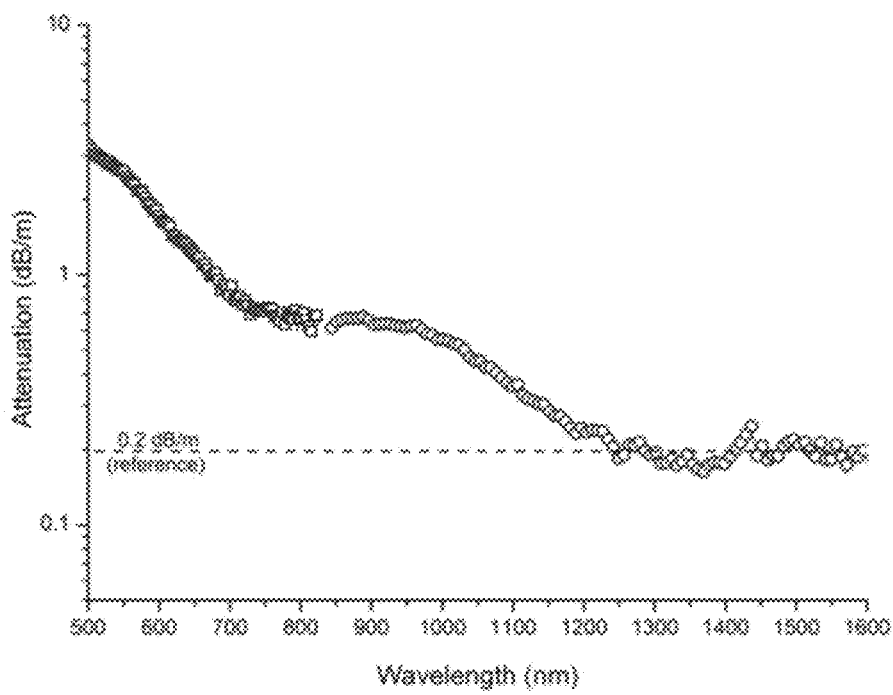
FIG. 7 illustrates the measured attenuation of a fiber using a cut-back method over a distance of about 5 meters. The two different data labels refer to measurements using two different light sources: tungsten light source (1) and optical spectrum analyzer (o). A reference line at 0.2 dB/m is provided as a guide to the eye.

FIG. 7 shows the measured attenuation spectrum for a typical 4.5 meter sample of the fiber. Losses as low as 0.2 dB/m were recorded with no traces of OH-observed in any of the fibers.

Figure 8:
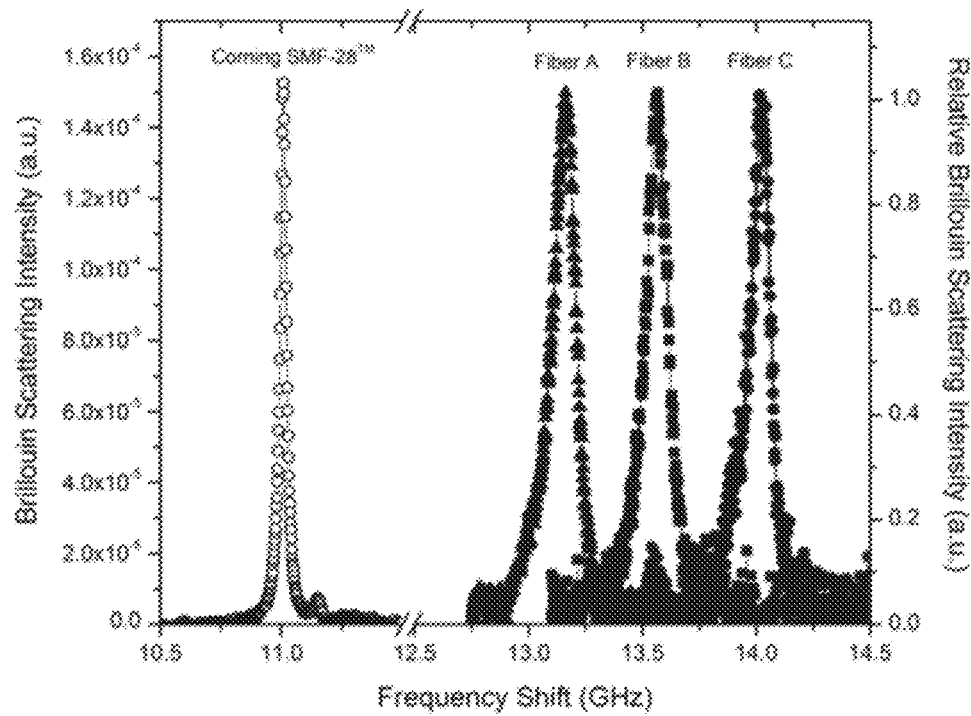
FIG. 8 illustrates Brillouin spectra for three fibers having different alumina contents in the core.

The Brillouin properties of the fibers were measured in order to obtain data over a range of compositions (Table 1). The Brillouin gain was far too low to obtain a measurement for Fiber D. While the peak frequency could be measured for Fiber C, the signal-to-noise ratio was far too low to yield a reliable spectral width measurement. The data was analyzed using an additive model in order to determine the physical properties of the alumina constituent. While the core diameters are fairly large (Table 1), these fibers are not truly bulk material and are acoustic anti-guides since alumina increases the acoustic velocity of the core relative to that of the pure silica cladding. FIG. 8 provides the measured Brillouin spectra for the samples of Table 1 along with that of Corning SMF-28™ to serve as a control fiber. Careful and restricted control of the fiber launch conditions ensured excitation of mainly the fundamental optical mode in the fibers. A slight asymmetry on the low energy side of the spectra results from minor excitation of higher-order optical modes (HOMs).

Measured features of the Brillouin spectra are summarized in Table 2.

TABLE 2

| Fiber | Average Alumina Content (mole %) | Measured Brillouin Frequency (GHz) | Measured Brillouin Linewidth (MHz) | Optical Mode Index $LP_{01}$ mode (1534 nm) |
| --- | --- | --- | --- | --- |
| A | 26 | 13.163 | 95 | 1.502 |
| B | 29.5 | 13.563 | 116 | 1.512 |
| C | 38 | 14.027 | NR* | 1.534 |
| D† | 54 | 15.608 | 263 | 1.562 |
| SMF-28 ™ | ~4 mole % GeO₂ | 11.008 | 29 | 1.446 |

*The SNR for this measurement was low and as such the spectral width measurement was not reliable (NR).
†The Brillouin spectrum could not be measured for this sample. Acoustic values are extrapolated using the additive model.

Figure 9:
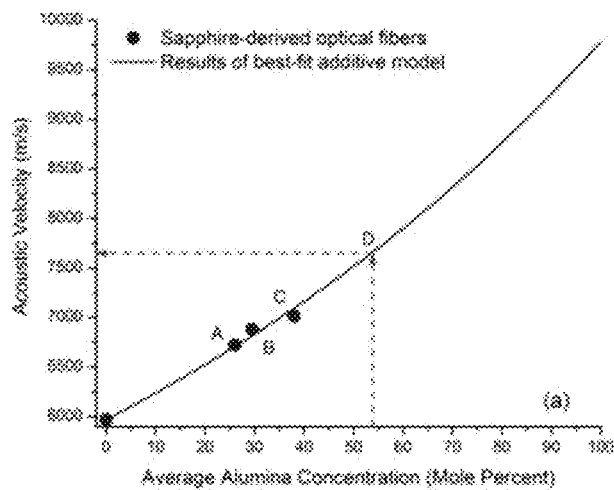
FIG. 9 illustrates the measured acoustic velocities for fiber segments plotted versus the average alumina concentration. The best-fit additive model also is shown, with a bulk alumina acoustic velocity found to be 9790 m/s.
Figure 10:
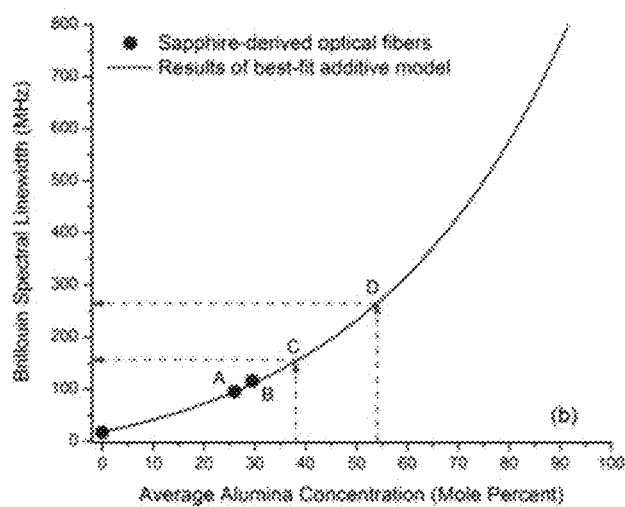
FIG. 10 illustrates the calculated Brillouin spectral width as a function of alumina concentration for an optical wavelength of 1534 nm. The calculated spectral width for Fiber D, about 263 MHz, is narrow enough to afford further Brillouin scattering suppression if optical signal spectral widths on the order of a GHz or more are tolerable.

The measured acoustic velocities are plotted as a function of alumina concentration for the sapphire-derived fiber samples tested, along with the best-fit additive model to the data, in FIG. 9. Similarly, the Brillouin spectral width is plotted in FIG. 10. Fibers C and D were not included in the fit to the spectral linewidth (FIG. 10) since the signal-to-noise (SNR) ratio was very low due to their extremely low Brillouin gain rendering the measurement of spectral linewidth unreliable. That said estimations for the acoustic velocity and Brillouin linewidth are provided in FIGS. 9 and 10, respectively, based on the measured alumina concentration averaged and the best fit to the additive model curve. In these cases, the acoustic velocity of Fiber D should be about 7665 m/s and the Brillouin linewidth for Fibers C and D should be about 153 MHz and 264 MHz, respectively. These results are summarized in Table 3 along with comparative values for pure silica.

TABLE 3

| Material | Acoustic Velocity (m/s) | Brillouin Linewidth (MHz) † | Refractive Index | Density (kg/m³) | Photoelastic Constant, $p_{12}$ |
|---|---|---|---|---|---|
| $SiO_2$* | 5970 | 17 | 1.443 | 2200 | 0.253 |
| $Al_2O_3$ | 9790 | 274 | 1.653 | 3350 | −0.03‡ |

*From Dragic, P. Brillouin Gain Reduction Via $B_2O_3$ Doping. J. Lightwave Technol. 29, 967-973 (2011) and Law, P., Croteau, A., & Dragic, P. Acoustic coefficients of $P_2O_5$-doped silica fiber: the strain-optic and strain-acoustic coefficients. Opt. Mater. Exp. 2, 391-404 (2012).
† Linewidth at a Brillouin frequency of 11 GHz.
‡The photoelastic constant was assumed to have the same value as that of bulk sapphire.

Figure 11:
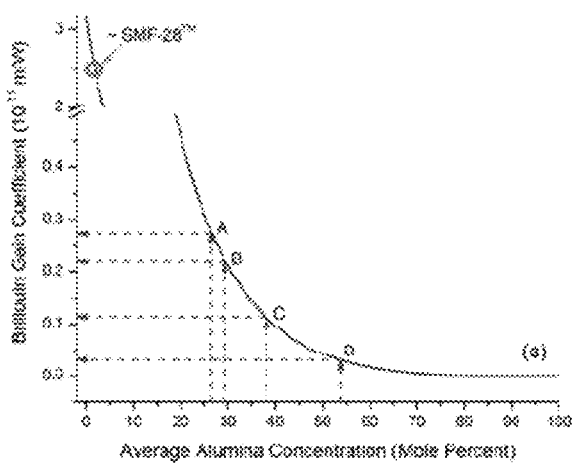
FIG. 11 illustrates the calculated Brillouin gain coefficient (BGC) as a function of the average alumina concentration for several fibers.
Figure 12:
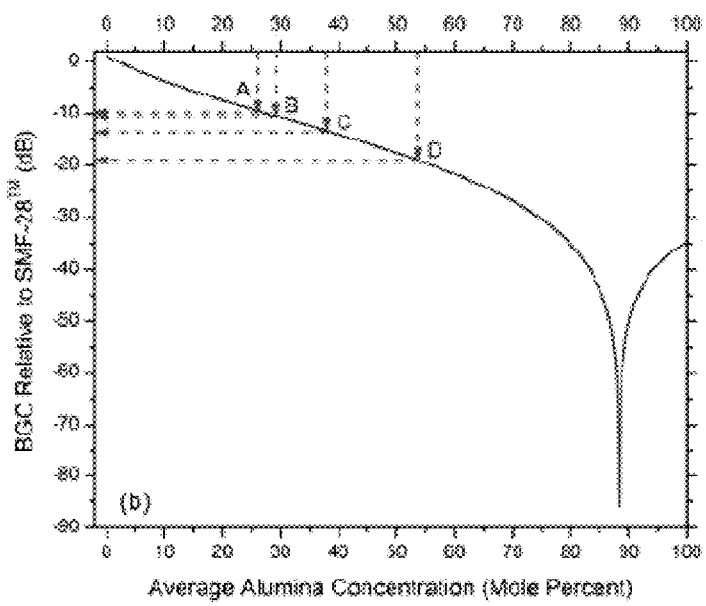
FIG. 12 illustrates the calculated Brillouin gain coefficient (BGC) relative to that for a control SMF-28™ fiber as a function of average alumina concentration.

Inspection of the table suggests a significant advantage in utilizing high-alumina content optical fibers for the realization of an ultra-low Brillouin gain media. FIG. 11 provides the BGC as a function of alumina concentration. FIG. 12 provides the BGC as a function of alumina concentration relative to that for the SMF-28™ control with the approximate location of the sapphire-derived optical fibers noted. As can be seen, The BGC monotonically decreases with alumina concentration and reaches extremely low, near-zero values at about 50 mole percent (63 weight percent), and then increases again. A zero-BGC value is encountered at an (average) alumina concentration of about 88 mole percent (92.5 weight percent) due to the negative photoelastic constant of alumina. As can be seen, the BGC is about 19 dB lower than that of the SMF for Fiber D. The Brillouin spectrum for Fiber D could not be measured because its gain was so low. It is clear from these calculations that there is a tremendous reduction in the Brillouin gain with the incorporation of alumina into silica at high concentrations.

In summary of the Brillouin gain measurements, in glasses with a large quantity of alumina, the increase in acoustic velocity, acoustic frequency, Brillouin spectral width, and mass density, coupled with the decrease in photoelastic constant, all cooperate to impart a tremendous reduction to the Brillouin gain, which only is offset partly by an increased refractive index. The fiber sample with the highest measured alumina content (Fiber D) was found to have a calculated Brillouin gain coefficient of around $3.1 \times 10^{-13}$ m/W, or around 19 dB lower than commercial SMF-28™. Broadening the optical signal spectrum to 1 GHz affords an additional 7 dB reduction in the Brillouin gain at a wavelength of 1534 nm. This would increase the SBS threshold to levels comparable to that of stimulated Raman scattering in conventional single mode fiber materials.

Figure 13:
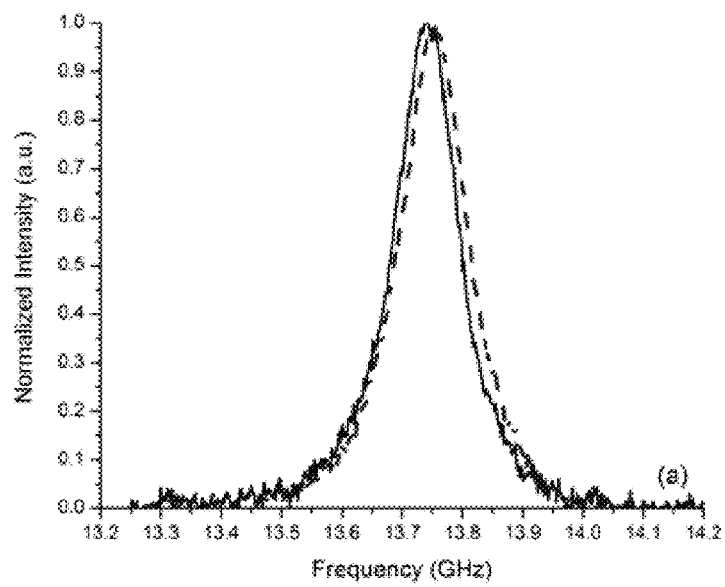
FIG. 13 illustrates Brillouin spectra for a fiber as disclosed herein measured at a 77.5 K temperature difference and exhibiting a change in Brillouin frequency with temperature of about 175 kHz/K.
Figure 14:
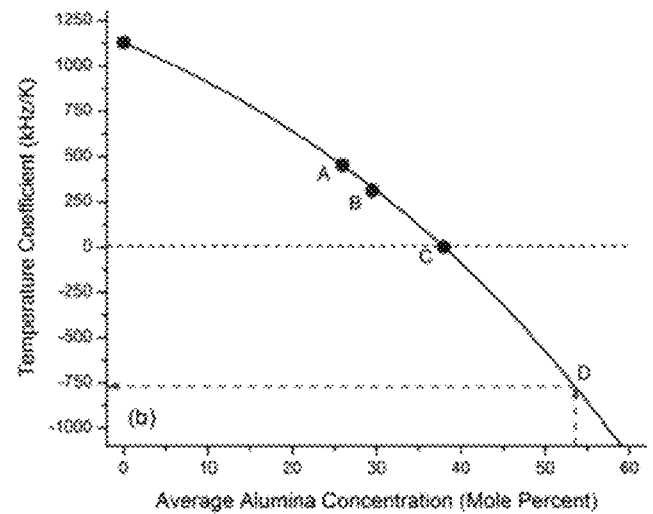
FIG. 14 illustrates the measured temperature dependence of the Brillouin frequency as a function of average alumina concentration for optical fibers as described herein and for pure silica.

FIG. 13 provides an example of thermal measurements of the relative Brillouin spectrum for a length of fiber near Fiber B. The spectra for Fiber C are indistinguishable at the two temperatures. The data for the three fibers whose Brillouin spectrum could be measured along with that for pure silica are shown plotted in FIG. 14 as a function of average alumina concentration. Utilizing the following values for silica (Thermo-acoustic coefficient (TAC)=+0.555 m/s/K and thermo-optic coefficient (TOC)=+10×10-6 $K^{-1}$), and the TOC for sapphire of about +12.5×10-6 $K^{-1}$, a best-fit utilizing the additive model yields a TAC of −1.9 m/s/K for alumina. The results of the additive model are shown as the continuous curve plotted in FIG. 14. Fiber C, as noted above, is found to have a composition such that its Brillouin frequency is temperature independent; that is, it is Brillouin athermal. The result of a best-fit of the additive model to the data is also provided (continuous line on FIG. 14). An estimation for Fiber D is provided since its very low Brillouin gain impeded a direct measurement.

Example 2

This example provides details on the fabrication of BaO-doped silica fibers. Characterizations of the fibers included determination of the refractive index profiles, attenuation spectra, compositional profiles, Brillouin spectra, and strain- and temperature-dependencies of the Brillouin scattering frequency. From these, the physical attributes of the bulk glassy baria were determined utilizing an additive model.
Fiber Fabrication As-purchased BaO powder (99.99% purity; Sigma Aldrich, St. Louis, Mo.) was sleeved inside an HSQ (Heraeus) fused silica tube measuring about 3.5 mm inner diameter by 30 mm outer diameter. This preform was drawn on a Heathway draw tower (Clemson University, Clemson, S.C.) at a temperature of about 1975° C. This temperature was chosen because BaO possesses a melting temperature of about 1920° C. fulfilling the requirement of the process that the core phase melt at a temperature below which the cladding glass draws into fiber. Between 100 and 200 meters each of fiber at (uncoated) diameters of 125 µm, 150 µm, and 175 µm were collected. The fibers all were coated with a standard single acrylate coating (DSM Desotech, Elgin, Ill.). The three fibers of this study were designated 'E,' 'F,' and 'G,' in order of increasing baria content. In the present case, these were the 150 µm, 175 µm, and 125 µm fibers, respectively. While data for all the fibers were similar, where appropriate data for Fiber G is shown as the illustrative example since it represented the highest baria content.
Refractive Index Profiles and Attenuation Spectra The refractive index profiles (RIPs) were measured by Interfiber Analysis (Livingston, N.J.) at a wavelength of about 1000 nm (with an uncertainty of ±0.00005) using a spatially resolved Fourier transform technique. The measured refractive index difference, Δn, at a wavelength of 1000 nm was assumed to be the same as at the Brillouin probe wavelength of 1534 nm, since it could not be measured at the longer test wavelength. Thus the refractive index of silica was taken to be its value at 1534 nm (1.444) and Δn was assumed from the RIPs. Spectral attenuation measurements were performed on ~1-2 meter segments of the drawn fiber. Over the range from 700-950 nm, a tungsten light source was used along with a miniature spectrometer (Ocean Optics Inc.). For the longer-wavelength measurements (up to 1700 nm), the broadband light source option on a Hewlett-Packard 7095 series optical spectrum analyzer was used.
Compositional Profiles Compositional analyses of the BaO-derived fiber cross-sections were performed under high vacuum, using energy dispersive x-ray (EDX) spectroscopy in secondary electron (SE) mode on a Hitachi SU-6600 analytical variable pressure field emission scanning electron microscope (with ±0.01% elemental uncertainty) at an operating voltage of 20 kV. Prior to examination, the fibers were sleeved and UV epoxy cured into silica glass ferrules and their ends mechanically polished to a 1 micron finish. The fiber samples were sputter-coated with carbon prior to analysis in order to provide a conductive layer to mitigate charging effects from the glass. Throughout this example, [BaO] is defined to be the BaO concentration in units of mole percent.

Brillouin Spectra

The Brillouin spectra of the fibers were recorded utilizing a heterodyne system. The system launches a narrow-linewidth signal at 1534 nm ($\lambda_o$=1534 nm) through a circulator and into the test fiber. The Stokes' signal generated in this fiber passes back through the circulator, is optically filtered and amplified, and finally is analyzed with a heterodyne receiver. Spectra were recorded for a number of applied strains (∈, defined here to be a fractional elongation), including the zero-strain case, and temperatures (T), also including room temperature. In order to measure the temperature dependence of the Brillouin frequency, the test fibers were immersed in a heated water bath, controlled from room temperature (21.5° C.) up to the boiling point (100° C.), such that measurements over a temperature range of about 80K could be made. In order to measure the strain dependence, one end of the test fiber was affixed to a rigid plate via an epoxy and the other end to a linear translation stage possessing a calibrated micrometer, wherein a linear stretch could be applied. It is noted that the measurements of all Brillouin spectra were performed on <1.5 meter segments of fiber in order to avoid any inhomogeneous spectral broadening due to any lengthwise variations in the fiber composition.

Thermo-Optic and Strain-Optic Coefficients

The measured Brillouin frequency is a function of the modal index (nm), acoustic velocity (V), and optical wavelength ($\lambda_o$) as $2 nmV/\lambda_o$ and taking the derivative with respect to temperature or strain yields $$\frac{dv}{d(T,\varepsilon)} = \frac{2}{\lambda_o}\left(V\frac{dn}{d(T,\varepsilon)} + n\frac{dV}{d(T,\varepsilon)}\right), \quad (1)$$

which possesses both optical (dn/d(T,∈)) and acoustic (dV/d(T,∈)) terms. The optical terms are proportional to the thermo-optic coefficient (TOC) and strain-optic coefficient (SOC), and the acoustic terms are the thermo-acoustic and strain-acoustic coefficients (TAC and SAC, respectively). Hence, to estimate how the acoustic velocity is influenced by strain or temperature, some knowledge or estimates of the TOC or SOC were needed.

These values were estimated by use of a fiber ring laser that was constructed utilizing a segment (~2 m) of test fiber for which determination of the TOC or SOC was desired. Since the laser was intentionally constructed to possess a plethora of longitudinal lasing modes, collecting the output of the laser with a detector and observing the resulting electrical output with an electrical spectrum analyzer (ESA) disclosed the free spectral range (FSR) of the laser in addition to the presence higher order harmonics of the FSR at the ESA. The FSR of this laser is a function of any strain (∈) or change in temperature (ΔT) of the test fiber, and thus any changes in strain or temperature will result in a change in measured frequency given by $$\Delta v_{ESA}^M = M\Delta FSR = -M\frac{c}{(nl+NL)^2}(n(l_0,\xi l_0) + lQ)(\varepsilon, \Delta T), \quad (2)$$

where M is the harmonic number on which the measurement is performed, c is the speed of light, and Q, in the case of strain, is defined to be Q=-½no3(SOC), with the SOC defined from the photoelastic constants and Poisson ratio (vp) to be SOC=p12−vp(p11+p12). Q is simply the TOC in the case of temperature. Clearly, the larger the M value, the more accurate will be the measurement. In Eq. (2), n is the mode index of the test fiber, which is a function of both temperature and strain, as n=$n_0$+∈Q+ΔT(TOC) with $n_0$ being the zero-strain room-temperature value. The test fiber length is similarly dependent on strain and temperature with l=$l_o$+∈$l_o$+ΔTξ$l_o$ where ξ is the linear thermal expansion coefficient. Since the core is held rigidly in the fiber, the linear thermal expansion coefficient of silica (i.e., the cladding) is assumed for each fiber. Finally, the product NL is found from a measurement of the zero-strain, room-temperature FSR (FSR$_0$) as NL=(c/FSR$_0$)−$l_o n_o$.

Results

Figure 15:
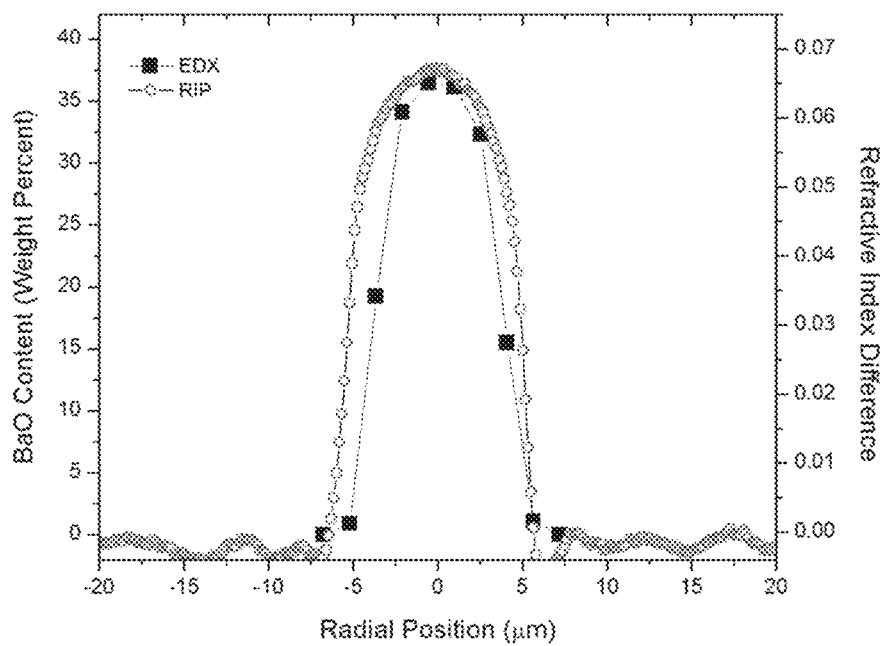
FIG. 15 displays the measured compositional (EDX) and refractive index profiles (RIP) a fiber as described herein.

FIG. 15 displays the measured compositional (EDX) and refractive index profiles (RIP) of Fiber G as a representative example. The refractive index profile, RIP, was measured at a wavelength of 1000 nm, (open circles; right ordinate) and BaO content was measured using energy dispersive x-ray spectroscopy, EDX (solid squares; left ordinate). The shape and position of the RIP and EDX were in excellent agreement with each other recognizing that the spatial precision of the measurements were slightly different. The core exhibited a graded-index (GRIN) shape resulting from the dissolution of cladding silica into the core during the fiber drawing process.

Figure 16:
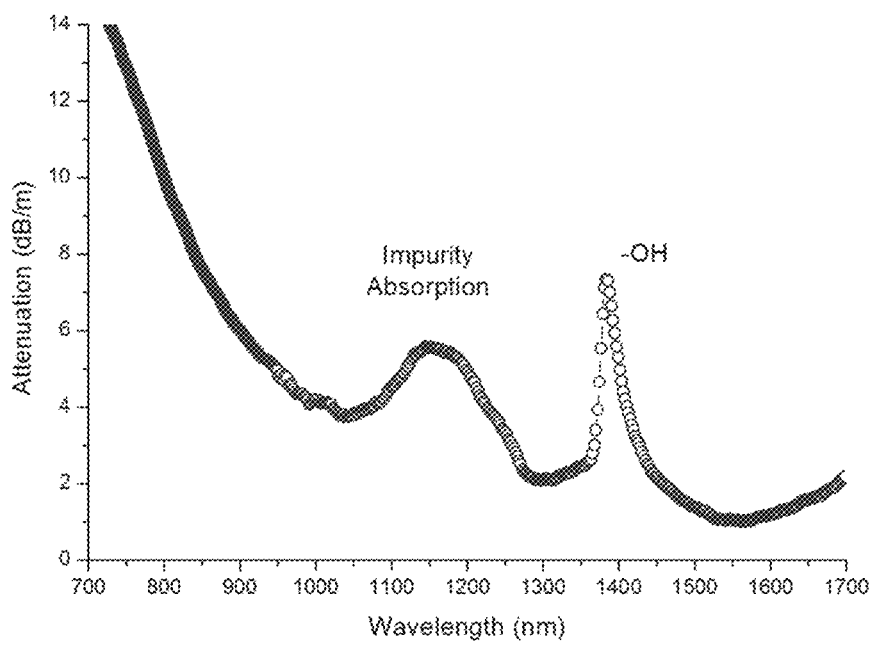
FIG. 16 illustrates the attenuation spectrum for a fiber as described herein.

Table 4, below presents a summary of the fiber characteristics including the peak refractive index difference and baria concentrations (in both wt % and mol %) for all three fibers fabricated and studied in this example. The modal index for each fiber was calculated from its RIP, and these values also are provided in Table 4. Additionally, the measured attenuation coefficients at 1534 nm also can be found in Table 4. The attenuation spectrum for Fiber G is provided in FIG. 16 and the minimum observed value of about 1 dB/m was typical of all the fibers studied. It was evident by the peak near 1390 nm that some OH was present in the fiber. The presence of OH is not surprising given the way in which the precursor BaO powder was processed. In addition, a broad absorption feature was observed near 1150 nm. The certificate of analysis for the precursor BaO powder testified to an overall purity of 99.7% (despite procuring 99.99% purity) with numerous trace transition metal and rare-earth impurities being present. While this absorption feature could not be definitively ascribed to a specific impurity, its spectral location suggested it could be a combination of $Sm^{3+}$, $Dy^{3+}$, and/or $Tm^{3+}$, all of which were present in the powder. Interestingly, much like for lightly $GeO_2$-doped silica fibers, the minimum attenuation wavelength was found to be near 1550 nm.

TABLE 4

| Property | Unit | Fiber E | Fiber F | Fiber G |
| --- | --- | --- | --- | --- |
| Cladding diameter | μm | 150 | 175 | 125 |
| Core diameter * | μm | 5.6 | 9.5 | 9.9 |
| Brillouin frequency (v) | GHz | 10.413 ± 0.002 | 10.263 ± 0.002 | 9.985 ± 0.002 |
| Δn (×10$^{-3}$) ** | — | 40.5 | 51.9 | 67.3 |

TABLE 4-continued

| Property | Unit | Fiber E | Fiber F | Fiber G |
|---|---|---|---|---|
| Mode index, $n_m$ (1534 nm, room temp, zero strain) *** | — | 1.4691 | 1.4837 | 1.5028 |
| Attenuation @ 1534 nm | dB/m | 0.6 | 0.8 | 1.1 |
| Modal acoustic velocity | m/s | 5437 | 5305 | 5096 |
| Acoustic velocity ** | m/s | 5364 | 5268 | 5051 |
| BaO concentration | wt. %, mole % | 22.8, 10.4 | 26.4, 12.3 | 36.5, 18.4 |
| Brillouin frequency thermal coefficient | MHz/K | 0.647 ± 0.026 | 0.497 ± 0.026 | 0.224 ± 0.026 |
| Thermo-optic coefficient | $10^{-5}\,K^{-1}$ | 1.11 | 1.15 | 1.22 |
| Brillouin frequency strain coefficient | GHz/ε | 29.4 ± 0.2 | 23.9 ± 0.2 | 13.6 ± 0.2 |
| Strain-optic coefficient | — | 0.119 | 0.112 | 0.103 |
| Brillouin Linewidth | MHz | 42.7 ± 0.5 | 48.1 ± 0.5 | 57.9 ± 0.5 |
| Density | kg/m³ | 2504 | 2561 | 2724 |

\* Full-width at half-maximum of the RIP
\** At fiber center
\*** Calculated

Figure 17:
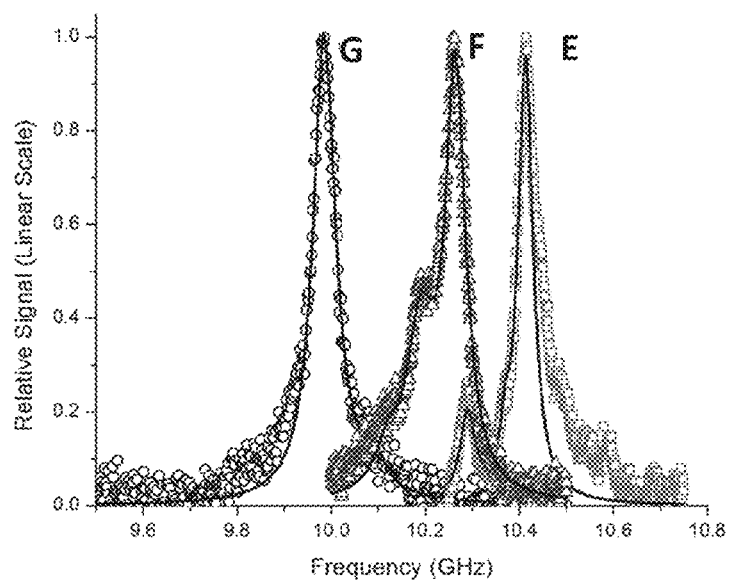
FIG. 17 presents normalized Brillouin gain spectra measured at room temperature and zero-strain for three BaO-doped fibers formed as described herein.

FIG. 17 provides the room temperature and zero-strain Brillouin spectra for the three BaO-derived fibers. The solid (black) lines in the figure are Lorentzian fits to the measured spectra. The spectra each appear to be somewhat distinct and exhibit a number of spectral features. Since the acoustic velocity of baria is lower than that of silica, the bariosilicate core acts as an acoustic waveguide, and thus frequencies found above the strongest peak are due to scattering from higher-order acoustic modes (HOAMs). This is especially apparent in the Fiber E spectrum with several HOAMs appearing at frequencies above 10.5 GHz.

Figure 18:
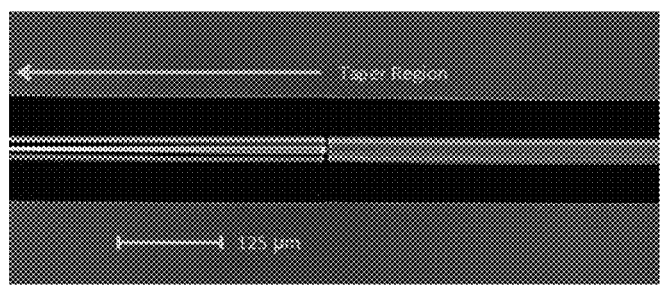
FIG. 18 illustrates a splice of a fiber as described herein (left-side fiber) and an SMF-28™ fiber (right-side fiber).
Figure 19:
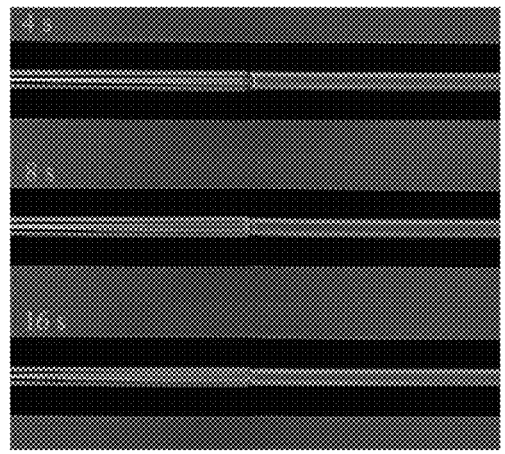
FIG. 19 illustrates the evolution of a BaO-doped fiber core with increasing splice time, as shown; the BaO-doped fiber was on the left-hand side.

Previously, the spectral distribution of Brillouin scattering involving the HOMs was continuous, whereas in the present case, distinct peaks appear. This is especially apparent in the Fiber E spectrum, where an additional peak near 10.3 GHz appears, rather than having a continuum-like distribution on the red side of the peak. FIG. 18 shows an example splice from Fiber G to SMF-28™ fiber. The splice duration was kept short (~2 s) due to the high diffusivity of bariosilicate glasses. The taper that formed during splicing seemed to act as an effective mode converter. The diameter of the SMF-28 cladding was 125 μm. It was found that baria readily diffused at splice temperatures resulting in significant thermally-induced expansion of the core dimension. Long splice times resulted in the complete apparent dissolution of the core. This is illustrated in FIG. 19 where a series of splices with identical splice power but differing splice times are shown. The taper that formed during splicing appeared to act as an effective mode converter, with some random HOMs apparently being selected.

Figure 20:
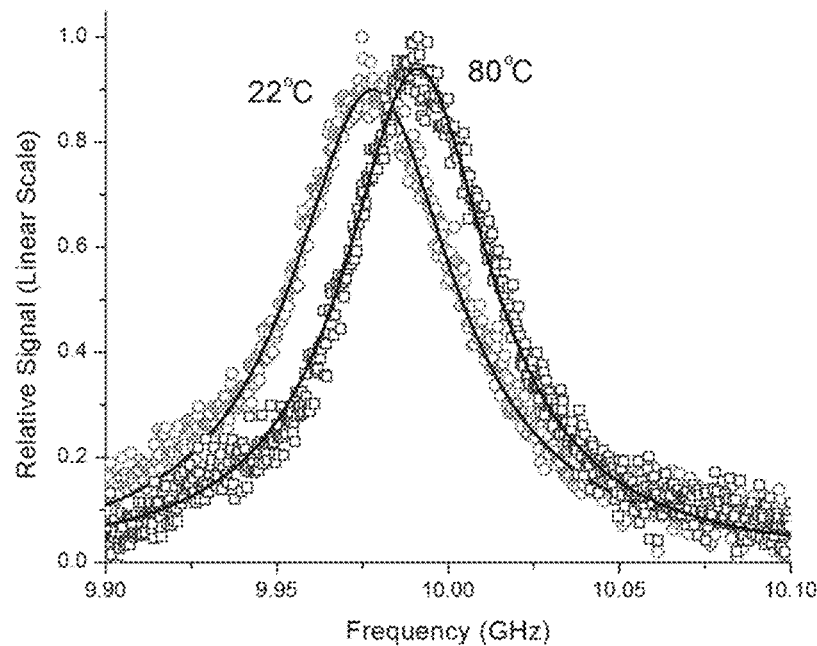
FIG. 20 presents Brillouin gain spectra for a fiber as described herein measured at 22° C. and at 80° C.

FIG. 20 provides the Brillouin spectra measured for Fiber G, as an example, at room temperature (22.0° C.) and at a temperature elevated by 58K. The Brillouin frequency increased while there was a decrease in the spectral width by about 6 MHz. Strain measurements provided essentially identical results as those of the temperature measurements, but the spectral width did not appear to change with strain. It was found that the temperature- and strain-dependence of the Brillouin frequency were both very linear and that the frequency increased with increasing temperature or strain. The best-fit slope to the linear data is provided in Table 4 as the measured strain and thermal coefficients.

Figure 21:
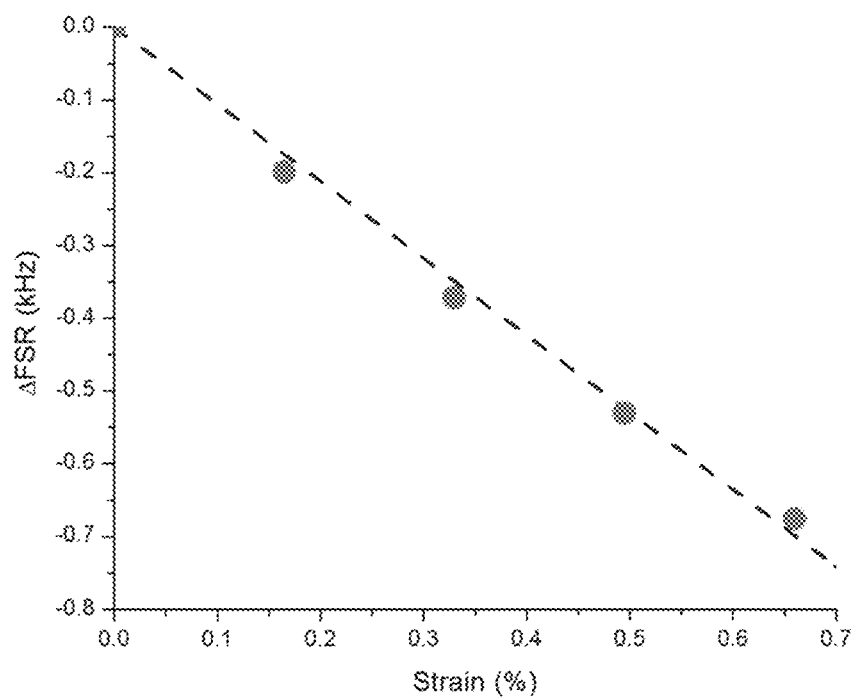
FIG. 21 presents the measured change in free spectral range (FSR) for a fiber as described herein as a function of strain.

The measurement of the TOC and SOC for each fiber was facilitated with a ring laser configuration as described. Measurements of the change in FSR versus temperature were much more linear than those versus strain. This is currently believed to be due to the optical mode distribution in the fibers being different for both measurements (thermal and strain). If the distribution of optical modes excited in the multimode fiber changes with some measurement condition, then so does the effective modal index in the ring laser, thereby influencing the measurement of the FSR by obscuring the change in the material values. In the case of temperature, the fiber was coiled and kept firmly in a heated bath such that movement of the fiber was kept minimal. However, in the case of strain, the fiber was stretched linearly with one fiber end translated with respect to the other. Hence with the latter, due to the motion of a small quantity of fiber beyond the translation stage, the ring became somewhat distorted as the measurement progressed, and thus probably resulted in changes in the distribution of optical modes excited in the BaO-doped test fiber. This led to a wide uncertainty range in the SOC measurements summarized in Table 4. By far, the worst-quality SOC data originated from Fiber E, which is consistent with the relative quality of the Brillouin spectra, and was probably related to the quality of splice achieved with this fiber. FIG. 21 shows the change in FSR versus strain for Fiber E after an average of 10 individual measurements. The data appear to be super-linear (parabolic). Ten individual sets of data were acquired and averaged to obtain this graph. A fit to the data is also shown (dashed line).

Example 2

Figure 22:
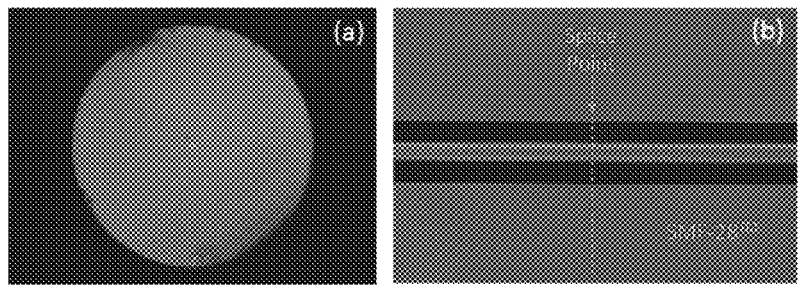
FIG. 22(*a*) is an end-on view of a fiber as described herein.

A rod of transparent ceramic spinel (Technology Assessment & Transfer, Inc., Millersville, Md.) was sleeved into a high purity silica tube and drawn at 2175° C. on a custom-built fiber draw tower (Clemson University). Because spinel is exceedingly refractory, with a (congruent) melting point of about 2135° C., a thick-walled silica tube (3.5 mm inner diameter, 40 mm outer diameter) was used for the cladding. By employing a thick-walled cladding tube, the effective draw temperature can be raised to above the melting point of the core phase, as required by the molten core method. Several hundred meters of 125 micron diameter silica-clad spinel-derived glass (i.e., now magnesium aluminosilicate) core fiber was drawn and coated with a conventional telecommunications UV-cured polymer coating, and two segments with different core sizes (and hence compositions), denoted hereafter as H and I, were utilized in the example. The refractive index profiles (RIPs) were measured (Interfiber Analysis, Livingston, N.J.) at a wavelength of 1000 nm, and the compositions were determined by energy dispersive X-ray (EDX) analysis (Clemson University). A representative optical image of the fiber (Fiber H) is shown in FIG. 22A.

In order to characterize the fibers' acousto-optic properties, the Brillouin spectrum was measured using a heterodyne method. The heterodyne setup consists of a 1,534 nm source, an optical circulator, amplifier, and heterodyne receiver. The test fiber was spliced at the end of a circulator, through which a 1,534 nm source was launched and the backward propagating Stokes' signal from the sample fiber passed back through the circulator to be filtered, amplified, and measured using the heterodyne receiver with a 1 MHz resolution. As an aside, an intermediate single mode fiber (SMF, Corning SMF-28™) was used between the circulator and the sample fiber. The splicing of the sample fiber to standard telecom-grade SMF was accomplished utilizing a standard SMF-SMF routine on a Vytran GPX glass processing system. An example of such a splice is shown in FIG. 22(b). The splice losses were estimated to be less than 0.1 and 0.4 dB for fibers H and I, respectively. The higher splice loss to Fiber I was due mainly to a mode mismatch between it and the SMF fiber (the mode diameter in Fiber I was smaller than in the SMF fiber).

Results

Figure 23:
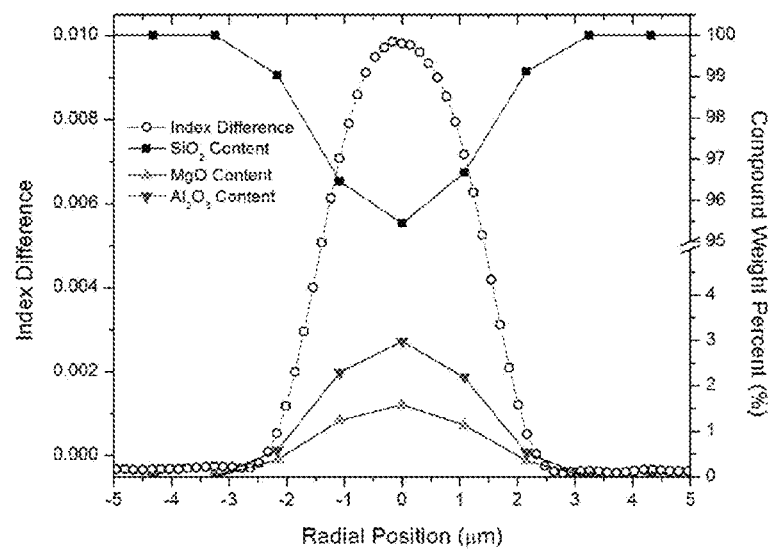
FIG. 23 presents the refractive index (open circles) and compositional profiles (filled shapes) for a fiber as described herein.

FIG. 23 provides the measured refractive index profile (RIP) and compositional profile of Fiber H (see Table 5) as an illustrative example. As expected, the index profile correlates with the $MgO+Al_2O_3$ content. More specifically, Fiber H exhibited a peak $MgO+Al_2O_3$ concentration of about 4.5 weight ° A) whereas Fiber I (not shown graphically but detailed in Table 5) had about 5.5 weight percent at its peak value. The corresponding change in refractive index was about 0.01 and 0.013 for Fibers H and I, respectively. It should be noted that while these MgO and $Al_2O_3$ concentrations seem relatively low, they exceed the miscibility limit of the constituents in silica at conventional silica-based optical fiber processing temperatures (e.g., MCVD, OVD, VAD methods) and so such compositions would likely be difficult to achieve using standard approaches. It is also noteworthy that the 1-to-1 $MgO$-to-$Al_2O_3$ (molar) stoichiometry of the precursor spinel was not preserved in the drawn fiber. For example, the peak weight percentages of MgO and $Al_2O_3$ in the Fiber H sample exemplified in FIG. 22 was 1.58 and 2.98, respectively, which converts to 2.37 and 1.76, respectively, in mole percent. The exact reason for this remains unclear, but suggests the preferential removal of $Al_2O_3$ from the system despite the fact that MgO is considerably more volatile than $Al_2O_3$ at the draw temperature. This finding with regard to the $MgO/Al_2O_3$ ratio also contrasts that observed in evaporated films. Accordingly, such unexpected chemistries speak to the potential materials science complexity and versatility possible with the disclosed method.

Figure 24:
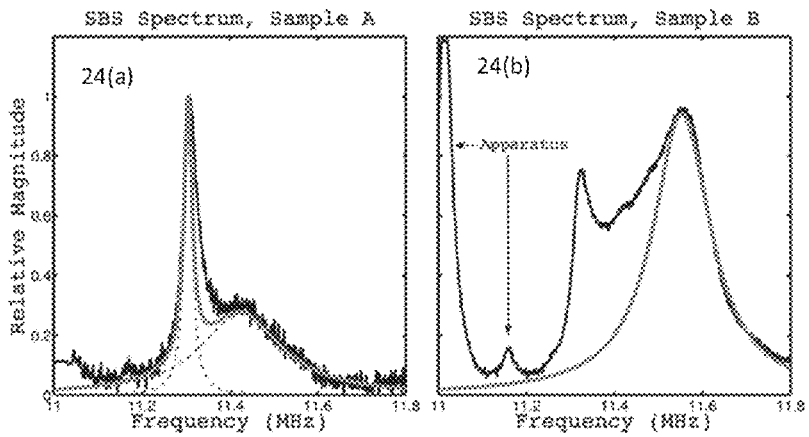
FIG. 24 presents the Brillouin spectrum (dark) from spinel fibers A (FIG. 24(*a*)) and B (FIG. 24(*b*)) fitted with a curve (light), which is composed of a superposition of Lorentzian curves (dashed). The small peak near 11.15 GHz is the second-order acoustic mode from the apparatus fiber.

The Brillouin spectra are shown in FIG. 24(a) for fiber H and FIG. 24(b) for fiber I. Both spectra have characteristic peaks corresponding to scattering from an acoustic wave in the pure-silica cladding (lower-frequency peak) and the spinel-derived magnesium aluminosilicate glass core, consistent with known calculations and measurements. A curve is fit to the rising-edge cladding and falling-edge core spectral components using Lorentzian curves (light) to estimate the widths of these interactions ($\Delta v$, Table 5). The region between the low-and-high frequency peaks has previously been identified as acousto-optic interactions with higher-order cladding acoustic modes, which is particularly pronounced for Fiber I, and far less significant for Fiber H. As a result of these contributions significantly obscuring the cladding interaction, the low-frequency fit was not included for Fiber I. Additionally, due to the weakness of the Fiber H signal relative to the contribution by the apparatus, the apparatus spectrum was measured and subtracted from the Fiber H spectrum. This was not necessary for the Fiber I spectrum and therefore was retained as a reference.

TABLE 5

| Value | Fiber H | Fiber I |
|---|---|---|
| $MgO + Al_2O_3$ content (peak wt. %) | 4.56 | 5.60 |
| Refractive index profile, $\Delta n$ (peak, $10^{-3}$) | 10.1 | 13.5 |
| Core diameter, 2a (µm) | 2.8 | 3.7 |
| Attenuation (dB/m @ 1534 nm) | 0.2 | 0.2 |
| $LP_{11}$ Cutoff (nm)* | 672 | 817 |
| Brillouin frequency core, $v_{core}$ (m/s) | 11.425 | 11.553 |
| Brillouin frequency clad, $v_{clad}$ (m/s) | 11.300 | 11.324 |
| Mode Index (nm @1534 nm) | 1.4448 | 1.4459 |
| Acoustic velocity core, $V_{core}$ (m/s) | 6065 | 6129 |
| Acoustic velocity clad, $V_{clad}$ (m/s) | 5999 | 6007 |
| $\Delta v_{core}$ (MHz) | 223 | 160 |
| $\Delta v_{clad}$ (MHz) | 23 | ** |

Figure 25:
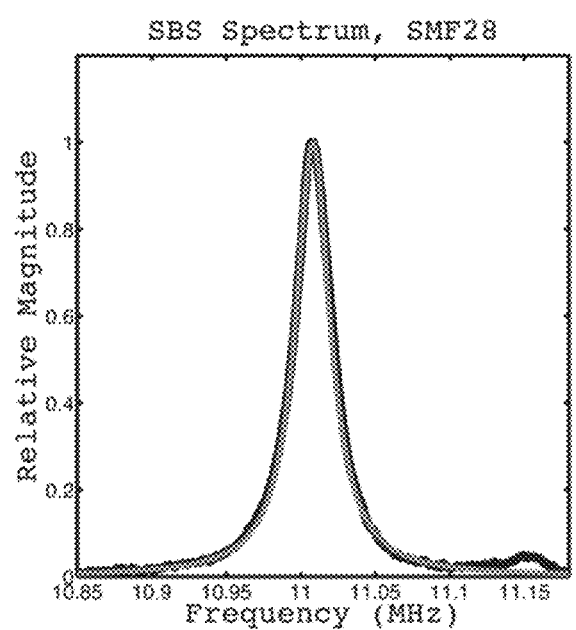
FIG. 25 presents the Brillouin spectrum (dark) from the SMF fiber of an apparatus (SMF-28™), fitted with a curve (light) to the main peak. The small peak near 11.15 GHz is due to the second-order acoustic mode.

*calculated from the RIP
** spectral component was too obscured for a reliable measurement By way of comparison, FIG. 25 provides a plot of the normalized Brillouin spectrum for a known single mode fiber SMF-28™. In order to compare the relative Brillouin gain of the SMF with the disclosed fibers, the assumption was made that the integral of the gain spectrum was conserved from fiber-to-fiber, and that a broadening of the spectrum resulted in a commensurate reduction in the Brillouin gain. Thus, Fiber H had a peak Brillouin gain about 4.9 dB lower than the SMF. Since Fiber I did not possess the large narrow peak seen in Fiber H, with its gain spectrum being more uniformly distributed, its Brillouin gain was similarly estimated to be approximately 9.3 dB lower than the SMF.

The Brillouin spectra from both fibers were considerably broadened due to the acoustically anti-guiding nature of the fibers. In fact, the spectral width of the core interaction was broadened to well over 200 MHz, diminishing its contribution relative to the cladding for Fiber H, and hence enabling a largely un-obscured measurement of the spectral width of the pure silica cladding; i.e., the intrinsic Brillouin line-width for silica. A value of 23 MHz was obtained; strikingly similar to that of bulk silica. The remaining measured values are summarized in Table 5. The core diameter, 2a, was defined to be the full-width at the half maximum of the RIP ($\Delta n$). The acoustic velocities (V) were determined from the measured Brillouin frequencies (v), modal indices (nmode), and optical wavelength ($\Delta$) using $V=\Delta v/2nmode$. The acoustic velocity in the cladding was taken to be that of silica in the present glass system. The modal indices and cutoff wavelengths for single mode operation for the fibers were calculated from the RIPs and are also provided in Table 5. The cutoff wavelengths ware consistent with purely single mode fibers at the Brillouin test wavelength of 1534 nm. The attenuation coefficient (also in Table 5) at this wavelength was measured utilizing a cutback method, and, while reasonable for the present analysis, its value is likely dominated by impurities in the commercial precursor crystal, as no effort was undertaken to optimize its purity.

In order to characterize the bulk properties of both the magnesia and alumina components of the core after transition to the glassy state, a ternary additive model, described in detail elsewhere was applied to the data. In short, all constituent materials (including silica) were assumed to obey a law of mixtures. The parameter used to weight the effect of each oxide component was the total volume of glass occupied by that component. This was calculated using molar percentage of the constituents present in the glass, measured by EDX, and the molar volume. Utilizing this model, the bulk values of the acoustic velocity, mass density, refractive index, etc. could be determined as fit parameters for each individual oxide species. The assumption was that these respective species could be treated as 'separable' and did not experience effects such as with, for example, the Al—P join in $AlPO_4$, wherein the net refractive index was actually lower than either the $Al_2O_3$ or $P_2O_5$ components taken individually.

This additive model described was used in conjunction with another boundary-value model in order to implement the fit-to-data. More specifically, since the compositional profile was not uniform, but rather graded, it was approximated by an eight-layer step-like one. Since each layer possessed a unique composition, each layer also had a unique set of material values, i.e. acoustic velocity, refractive index, etc. The values for the bulk components (magnesia and alumina) were iterated until the calculated values for the optical and acoustic modes best fit those measured for each fiber, and then the results for the two fibers were averaged. The final results are summarized in Table 6 and the uncertainty was half the difference between the best-fit parameters for Fibers H and I.

TABLE 6

| Value | $SiO_2$ | MgO | $Al_2O_3$ |
|---|---|---|---|
| Mass Density (kg/m$^3$) | 2200* | 3322 ± 14 | 3693 ± 15 |
| Refractive Index | 1.444* | 1.8103 ± 0.0073 | 1.8225 ± 0.0074 |
| Acoustic Velocity (m/s) | 6003 ± 5 | 8731 ± 44 | 10625 ± 53 |

*from P. Dragic, "Estimating the effect of Ge doping on the acoustic damping coefficient via a highly Ge-doped MCVD silica fiber," J. Opt. Soc. Am. B 26, 1614-1620 (2009).

The spectra measured for the two fibers were highly acoustically-antiguiding, resulting from the fact that both magnesia and alumina increased the acoustic velocity relative to silica, resulting in very broad Brillouin spectra. Therefore it can be concluded that magnesia increases the acoustic velocity when added to silica. Additionally, while the model accommodates acoustically anti-guiding fibers by determining a complex propagation constant (which includes the waveguide attenuation term), the waveguide loss term greatly dominates the material damping associated with the addition of alumina and magnesia. Therefore due to uncertainties in the fitting, reliable measurements of the visco-elastic damping loss for magnesia could not be made.

The deduced densities of the alumina and magnesia were lower than their crystalline counterparts, as were the acoustic velocities. However, the alumina density value was somewhat larger relative to previous observations. One possible explanation is the presence of magnesia and its effect on the glass network.

While there may be some effects brought about by the presence of magnesia, the density and acoustic velocity modeling parameters deduced suggest that alumina and magnesia can be treated as independent species in the drawn fiber. Alternatively, the coordination may have imprinted from the precursor crystal and rapid processing and quenching of the resultant glass simply made the final glassy phase more closely resemble the precursor crystalline phase.

Also interesting is the fact that the deduced refractive index contributions from both the alumina and magnesia are higher than their respective crystalline counterparts.

What have been described above are examples. It is, of course, not possible to describe every conceivable combination of components or methodologies for purposes of describing the subject matter, but one of ordinary skill in the art will recognize that many further combinations and permutations of the subject matter are possible. Accordingly, the disclosure is intended to embrace all such alterations, modifications, and variations that fall within the scope of this application, including any appended claims.

What is claimed is:

1. An optical fiber, the optical fiber comprising a core component and a clad component, the core component including an interaction product of a precursor core material and a clad material, the precursor core material and the clad material having photoelastic constants of opposite sign.

2. The optical fiber of claim 1, wherein the precursor core material has a negative photoelastic constant and the clad material has a positive photoelastic constant.

3. The optical fiber of claim 1, wherein the clad material is an oxide glass.

4. The optical fiber of claim 3, wherein the clad material is a silicate glass.

5. The optical fiber of claim 1, wherein the precursor core material is an aluminum-oxide based compound.

6. The optical fiber of claim 5, wherein the core component includes the aluminum-oxide based compound at a concentration of about 15 mole percent or greater of the core component.

7. The optical fiber of claim 1, wherein the precursor core material is an aluminate, an aluminosilicate, an aluminophosphate, or an aluminoborate.

8. The optical fiber of claim 1, wherein the precursor core material is spinel ($MgAl_2O_4$), barium oxide (BaO), or β-barium borate ($BaB_2O_4$).

9. The optical fiber of claim 1, the clad component and/or the core component further comprising a dopant.

10. The optical fiber of claim 9, wherein the dopant comprises a transition metal dopant or a rare earth dopant.

11. The optical fiber of claim 9, wherein the dopant comprises an active dopant.

12. The optical fiber of claim 1, wherein the fiber has a Brillouin gain coefficient of less than about $10^{-13}$ meters per Watt.

13. The optical fiber of claim 1, wherein the fiber has a Brillouin gain coefficient of from about $4.5 \times 10^{-12}$ to about $2 \times 10^{-16}$ meters per Watt.

14. The optical fiber of claim 1 wherein the fiber has a Brillouin gain coefficient at least 6 dB below that of the clad material.

15. The optical fiber of claim 1, wherein the fiber has a Brillouin frequency of greater than about 10 gigahertz at an optical wavelength of 1550 nm.

16. The optical fiber of claim 1, wherein the fiber has a change in Brillouin frequency of less than about 1000 kilohertz per degree Kelvin at 1550 nm.

17. The optical fiber of claim 1, wherein the precursor core material is one component of a precursor core, the precursor core further including a second precursor core material in conjunction with the precursor core material, the core component including the interaction product of the precursor core material, the second precursor core material, and the clad material.

18. The optical fiber of claim 17, wherein the second precursor core material and the clad material have photoelastic constants of the same sign.

19. The optical fiber of claim 18, wherein the precursor core has a photoelastic constant that is the same sign as the photoelastic constant of the clad material.

20. The optical fiber of claim 19, wherein the absolute value of the photoelastic constant of the precursor core is about 0.5 or less of the absolute value of the photoelastic constant of the clad material.

21. The optical fiber of claim 1, wherein the precursor core material is a component of a precursor core, the precursor core having a photoelastic constant of the opposite to that of the photoelastic constant of the clad material.

22. A method for forming an optical fiber, comprising drawing a fiber preform, the fiber preform including a core component and clad component, the core component including a precursor core material and the clad component including a clad material, the precursor core material and the clad material having photoelastic constants of opposite signs, the fiber preform being drawn at a draw temperature at which the core component is molten.

23. The method of claim 22, wherein the draw temperature is less than about 10° C. above the melting temperature of the core component.

24. The method of claim 22, wherein the draw temperature is greater than about 10° C. above the melting temperature of the core component.

25. The method of claim 22, wherein the fiber preform is drawn at atmospheric pressure.

26. The method of claim 22, wherein the fiber preform is drawn under a vacuum.

27. The method of claim 22, wherein the precursor core material is a component of a precursor core, the precursor core further including a second precursor core material in conjunction with the precursor core material.

28. The method of claim 27, wherein the second precursor core material and the clad material have photoelastic constants of the same sign.

29. The method of claim 27, wherein the precursor core and the clad material have photoelastic constants of the same sign.

30. The method of claim 29, wherein the precursor core has a photoelastic constant with an absolute value that is about 0.5 or less of the absolute value of the photoelastic constant of the clad material.

31. The method of claim 22, wherein the precursor core material is a component of a precursor core, the precursor core having a photoelastic constant of the opposite to that of the photoelastic constant of the clad material.

32. The method of claim 22, the core component and/or the clad component further comprising a dopant.

* * * * *